United States Patent
Grover et al.

(10) Patent No.: US 7,334,082 B2
(45) Date of Patent: Feb. 19, 2008

(54) METHOD AND SYSTEM TO CHANGE A POWER STATE OF A HARD DRIVE

(75) Inventors: Andrew S. Grover, Beaverton, OR (US); Guy Therien, Beaverton, OR (US); Brian A. Leete, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 10/749,756

(22) Filed: Dec. 30, 2003

(65) Prior Publication Data
US 2005/0144377 A1    Jun. 30, 2005

(51) Int. Cl.
*G06F 13/00* (2006.01)
*G06F 1/26* (2006.01)

(52) U.S. Cl. .................... 711/113; 713/320
(58) Field of Classification Search .............. None
See application file for complete search history.

(56) References Cited

U.S. PATENT DOCUMENTS

| | | | | |
|---|---|---|---|---|
| 5,481,733 A | * | 1/1996 | Douglis et al. ......... | 713/324 |
| 5,898,880 A | * | 4/1999 | Ryu ....................... | 713/323 |
| 6,134,631 A | * | 10/2000 | Jennings, III ............ | 711/117 |
| 2003/0074524 A1 | * | 4/2003 | Coulson .................. | 711/113 |
| 2005/0071561 A1 | * | 3/2005 | Olsen et al. ............. | 711/118 |
| 2005/0125600 A1 | * | 6/2005 | Ehrlich ................... | 711/112 |
| 2005/0125607 A1 | * | 6/2005 | Chefalas et al. ......... | 711/113 |

FOREIGN PATENT DOCUMENTS

GB    2286267 A  *  8/1995

* cited by examiner

*Primary Examiner*—Hyung Sough
*Assistant Examiner*—Craig E Walter
(74) *Attorney, Agent, or Firm*—Blakely, Sokoloff, Taylor & Zafman LLP

(57) ABSTRACT

A method and system to detect an occurrence of a predetermined event within the system, and change a power state of a hard drive (HD) in response to the event, are described. In one embodiment, in response to detecting consecutive HD reads have been satisfied by a non-volatile cache (NVC) of the HD, for at least a predetermined period of time, or detecting that a predetermined quantity of consecutive HD reads have been satisfied by the NVC, spinning down the HD. In an alternative embodiment, in response to detecting a predetermined number of HD data transactions have been serviced by the NVC or the HD, canceling a planned spinning down of the HD or spinning up the HD.

9 Claims, 5 Drawing Sheets

METHOD AND SYSTEM TO CHANGE A POWER STATE OF A HARD DRIVE

NOTICE OF RELATED APPLICATIONS

This application is related to copending patent application titled METHOD AND SYSTEM TO ADJUST NON-VOLATILE CACHE ASSOCIATIVITY, patent application Ser. No. 10/750,040 filed Dec. 30, 2003, copending patent application titled METHOD AND APPARATUS TO SAVE HISTORICAL HARD DISK PERFORMANCE DATA, patent application Ser. No. 10/749,815 filed Dec. 30, 2003, and copending patent application titled METHOD AND APPARATUS TO SPIN UP A DISK DRIVE PRIOR TO A DISK DRIVE DATA EXCHANGE REQUEST, patent application Ser. No. 10/750,037 filed Dec. 30, 2003.

FIELD OF INVENTION

The field of invention relates generally to data processing; and, more specifically, to a method and system to change a power state of a hard drive in response to a predetermined event.

BACKGROUND

A hard drive may be provided with a cache for the hard drive, typically found in random access memory (RAM), to cache data that has been read from the hard drive. However, because the hard drive cache is located in the RAM, data which is to be written to the hard drive is unable to be cached in the cache of the hard drive, because if the computer system were to fail the data to be written to the hard drive would be lost due to the loss of power to the RAM.

In addition, for mobile computers, repeatedly accessing the hard drive is a power consuming activity that involves a power management policy that attempts to reduce the frequency of spinning up the hard drive and the continued use of the hard drive. For example, common run time power management on operating systems for hard drives, consists of, if the hard drive doesn't receive requests in X minutes, the hard drive spins down.

DETAILED DESCRIPTION

A method and system to detect an occurrence of a predetermined event within the system, and change a power state of a hard drive (HD) in response to the event, are described. In one embodiment, in response to detecting consecutive HD reads have been satisfied by a non-volatile cache (NVC) of the HD, for at least a predetermined period of time, or detecting that a predetermined quantity of consecutive HD reads have been satisfied by the NVC, spinning down the HD. In an alternative embodiment, in response to detecting a predetermined number of HD data transactions have been serviced by the NVC or the HD, canceling a planned spinning down of the HD or spinning up the HD.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In addition, as described herein, a trusted platform, components, units, or subunits thereof, are interchangeably referenced as a protected or secured.

Figure 1:
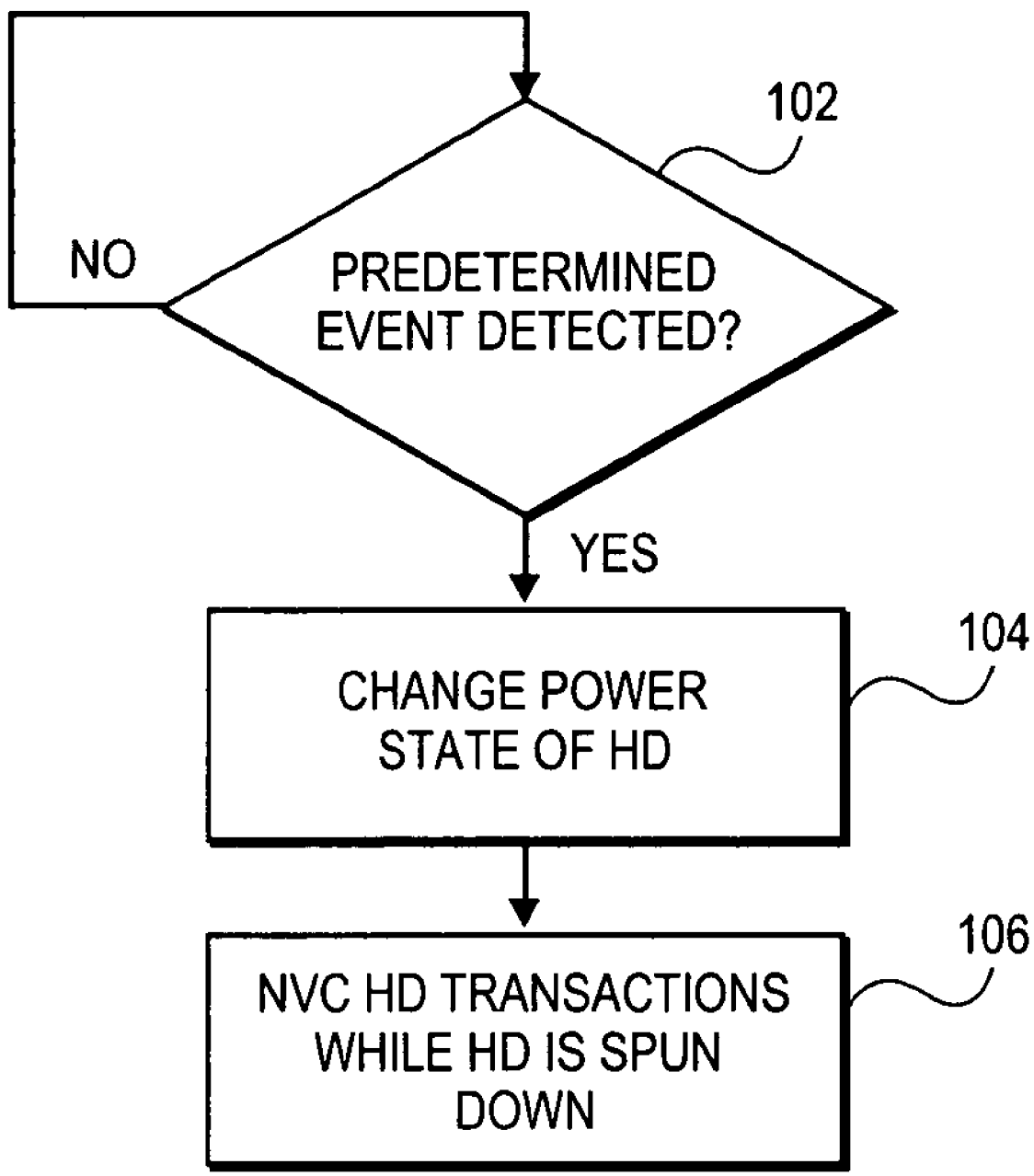
FIG. 1 presents a flow diagram describing the processes of changing a power state of a hard drive, according to one embodiment.
Figure 2:
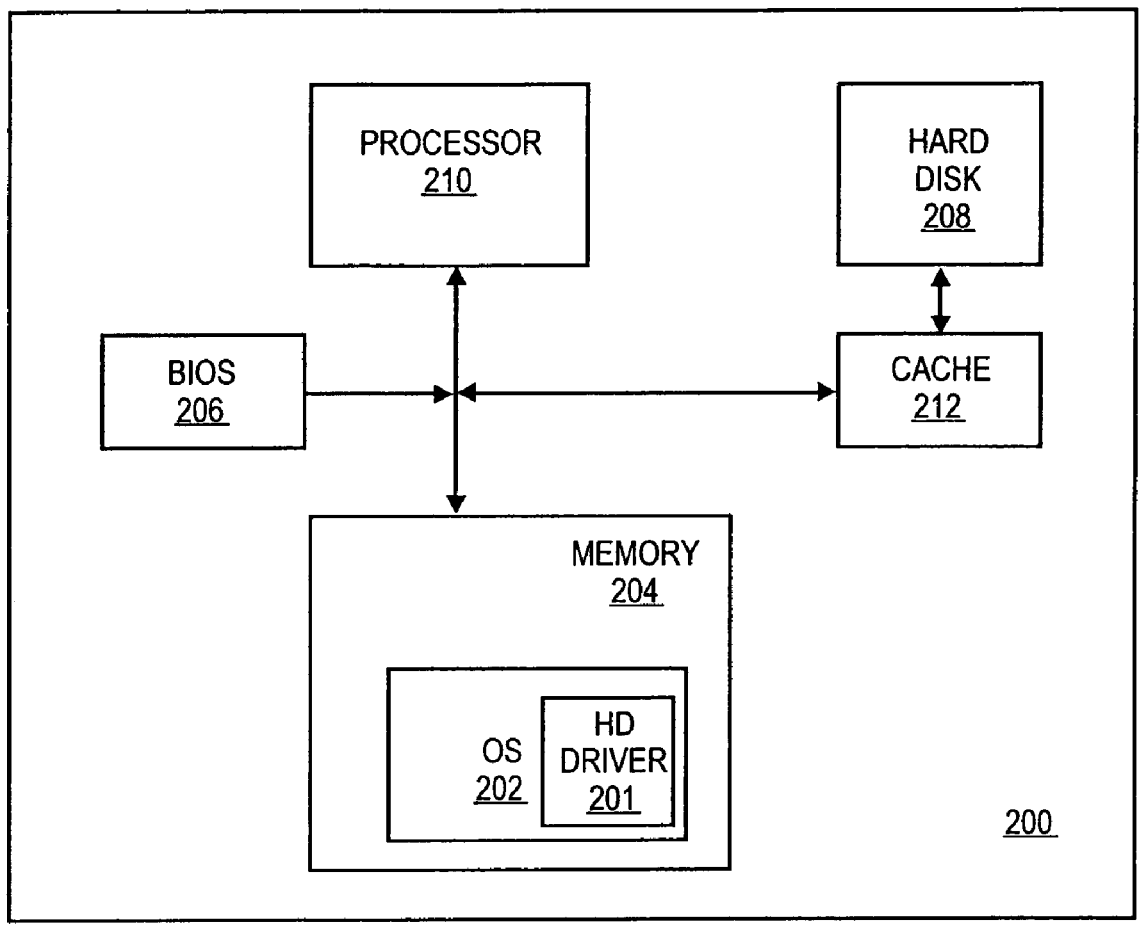
FIG. 2 presents a diagram of a system to change a power state of a hard drive, according to one embodiment.

FIG. 1 presents a flow diagram describing the processes of changing a power state of a hard drive according to one embodiment. The flow diagram is described with reference to the computer system 200 illustrated in the diagram of FIG. 2.

In process 102, the occurrence of a predetermined event is detected within the computer system 200. In one embodiment, the occurrence of the predetermined event is detected by an operating system 202 within the system, shown stored in memory 204 of the system. Alternatively, a driver of a component within the system, such as the driver 201 of the hard drive (HD), may detect the occurrence of the predetermined event. In other alternative embodiments, alternative units may be used to detect the occurrence of the predetermined event, such as the Basic Input Output System (BIOS) 206.

In process 104, in response to detecting the predetermined event, a power state of the hard drive 208 of the computer system is changed. Depending upon the predetermined event, the hard drive is either activated from a deactive state (i.e., spinning up the HD), or deactivated from active state (i.e., spinning down the HD). The hard drive, as referenced herein, includes a primary storage medium of the system. In process 106, HD data transactions (including read and/or write requests sent to the HD) are serviced by an NVC 212 of the HD while the HD is spun down.

Figure 3:
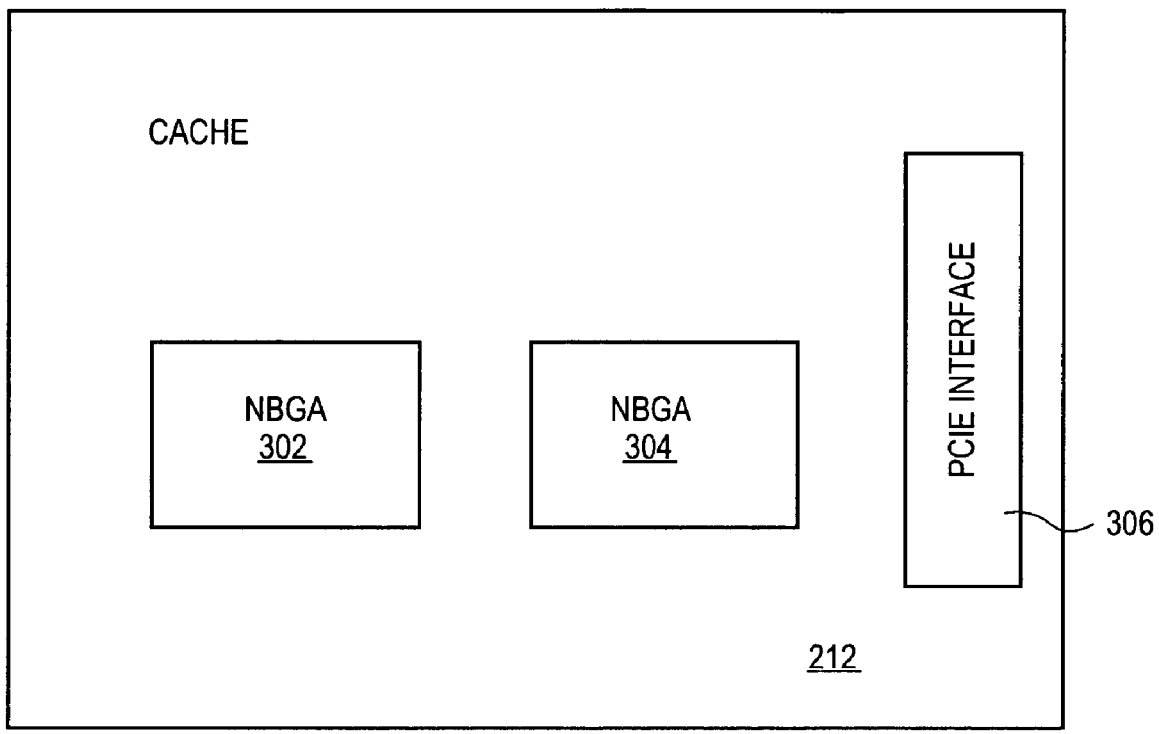
FIG. 3 presents a flow diagram describing the process of changing a power state of a hard drive, in greater detail, according to one embodiment.

In one embodiment, as stated above, the NVC 212 is a cache of the HD 208. FIG. 3 illustrates the NVC according to one embodiment. In one embodiment, the cache 212 of the hard drive 208 is a thin film electronics memory made of Ferroelectrics polymer with multiple layers stacked on top of a complimentary metal oxide semiconductor (CMOS). In one embodiment, the cache 212 of the hard drive 208 has a 512 megabyte (mb) capacity. In one embodiment, the cache comprises two 256 mb micro Ball Grid Arrays (BGA) 302, 304. In one embodiment, the cache 212 includes a form factor of a Mini Peripheral Component Interconnect Express (PCIE) card, and also includes PCIE interface 306. In alternative embodiments, the cache 212 may be made of alternative materials, consist of an alternative capacity, an alternative form factor, and/or and alternative interface.

Figure 4:
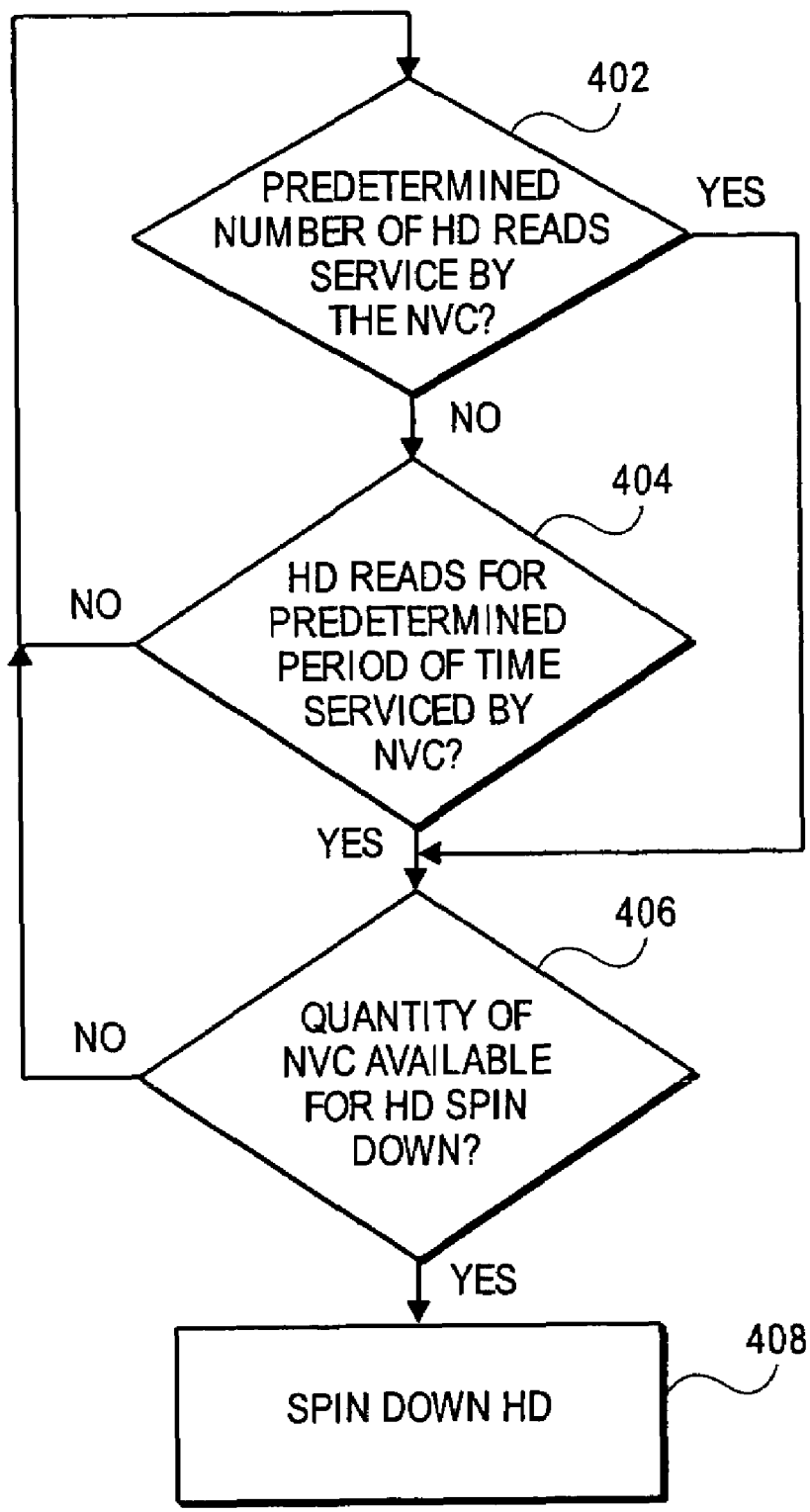
FIG. 4 presents a flow diagram describing the process of changing a power state of a hard drive, in greater detail, according to an alternative embodiment.

FIG. 4 presents a flow diagram describing the process of changing a power state of the hard drive, in greater detail, according to one embodiment. Again, the flow diagram is described with reference to the computer system 200 illustrated in the diagram of FIG. 2.

In process 402, a determination is made whether a predetermined number of consecutive most recently received HD reads have been satisfied by the NVC. If the predetermined number of consecutive most recently received HD reads have not all been satisfied by the NVC, in process 404, a determination is made whether consecutive HD reads for a previous predetermined period of time have all been satisfied by the NVC. If consecutive HD reads for a previous predetermined period of time have not all been satisfied by the NVC, the process returns to process 402.

If a predetermined number of consecutive most recently received HD reads have been satisfied by the NVC, or if consecutive HD reads for a previous predetermined period of time have all been satisfied by the NVC, in process 406 a determination is made whether a predetermined quantity of the NVC would be available to service HD writes when the HD is spun down. In one embodiment, a portion of the NVC is allocated to storing clean data (i.e., copies of the data are also stored in the HD) and a portion of the NVC is allocated to storing dirty data (i.e., data for which there is no copy stored in the HD, or the version of the data stored in the HD has not been updated). In one embodiment, in the process 406, a determination is made whether a predetermined quantity of the portion of the NVC allocated for dirty data remains available (i.e., contains no data or clean data that can be overwritten) to store additional dirty data while the HD is spun down.

In one embodiment, a cache manager would set the allocation of clean data to dirty data for the NVC. Furthermore, the cache manager could also determine the level of dirty data currently in the NVC 212, and therefore a quantity of the portion of the NVC that remains available for dirty data. In one embodiment, the cache manager could be part of the HD driver 201, or be separate from the HD driver 201, working in concert with the HD driver 201, or working in a layered fashion.

If a predetermined quantity of the NVC is not available to service HD writes, the process returns to process 402, as described above. If a predetermined quantity of the NVC is available to service HD writes, in process 408 the power state of the HD is changed, which includes spinning down the HD. In one embodiment, some or all of the processes as described above in reference to FIG. 4 are performed by HD driver. Alternatively, the operating system (OS) 202 of the system 200 may perform certain of the processes as described above.

Figure 5:
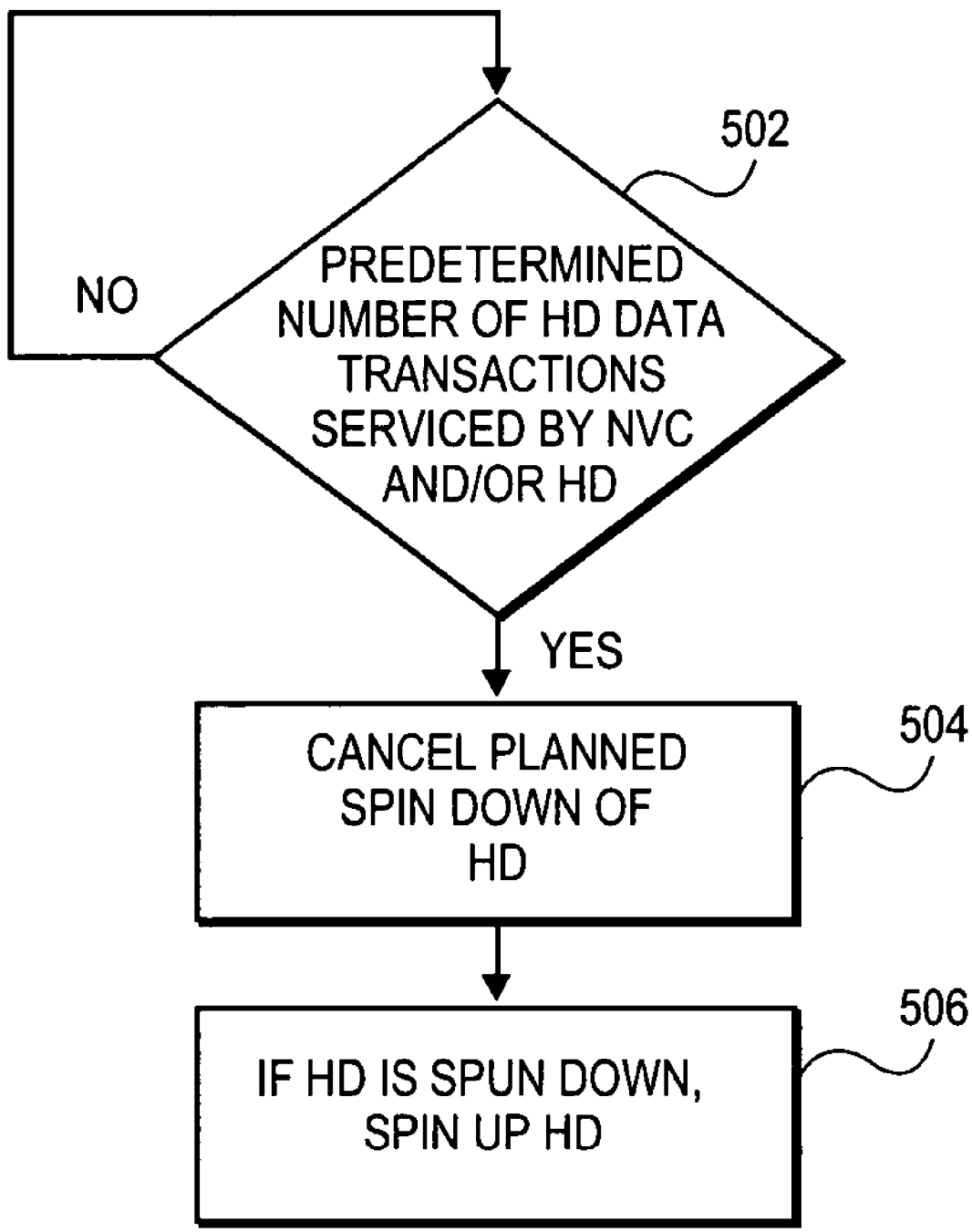
FIG. 5 presents a diagram of a non-volatile cache used according to one embodiment.

FIG. 5 presents a flow diagram describing the process of changing a power state of the hard drive, in greater detail, according to an alternative embodiment. Again, the flow diagram is described with reference to the computer system 200 illustrated in the diagram of FIG. 2.

In process 502, a determination is made whether a predetermined number of HD data transaction have been received and serviced by the NVC 212 and/or the HD 208, as a total quantity of HD data transactions. In one embodiment, the predetermined number of HD data transactions are to have been received within a most recent predetermined period of time.

If a predetermined number of HD data transactions have not been received by the NVC 212 and/or the HD 208, the process returns to process 502 to perform the determination again following the passage of a predetermined period of time. If a predetermined number of HD data transactions have been received by the NVC 212 and/or the HD 208, within the most recent predetermined period of time, in process 504, if there is a planned spinning down of the HD, the spinning down is canceled. If the HD is spun down, in process 506, the HD is spun up.

In one embodiment, some or all of the processes as described above in reference to the flow diagram of FIG. 5, are performed by HD driver. Alternatively, the operating system (OS) 202 of the system 200 may perform certain of the processes as described above.

The processes described above can be stored in the memory of a computer system as a set of computer-readable instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a hard drive (or computer-readable medium drive). Further, the instructions can be downloaded into a computing device over a data network in a form of compiled and linked version.

Alternatively, the logic to perform the processes as discussed above could be implemented in additional computer and/or machine readable storage media, such as discrete hardware components as large-scale integrated circuits (LSI's), application-specific integrated circuits (ASIC's), and firmware such as electrically erasable programmable read-only memory (EEPROM's); etc.

In the foregoing specification, the invention has been described with reference to specific exemplary embodiments thereof. It will, however, be evident that various modifications and changes may be made thereto without departing from the broader spirit and scope of the invention as set forth in the appended claims. For example, the non-volatile memory unit, as described herein, may be used as a cache for other components with a system, other than the HD. The specification and drawings are, accordingly, to be regarded in an illustrative rather than a restrictive sense.

The invention claimed is:

1. A method comprising:
    making a first determination whether a number of previous consecutive reads of a hard drive (HD) satisfied by a non-volatile cache (NVC) of the HD is greater than or equal to a previously determined number;
    making a second determination whether a period of time of previous consecutive HD reads satisfied by the NVC of the HD is greater than or equal to a previously determined period of time;
    making a third determination whether a quantity of the NVC that would be available to service HD writes when the HD is spun down is greater than or equal to a previously determined quantity of memory space; and
    if the third determination is true and if at least one of the first determination and the second determination is also true, then
        spinning down the HD, and
        servicing HD data transactions with the NVC while the HD is spun down.

2. The method of claim 1, further comprising:
    making a fourth determination whether, in another previously determined period of time, a number of transactions which were serviced by the NVC or the HD is greater than or equal to another previously determined number; and
    if the fourth determination is true, then changing the power state of the HD.

3. The method of claim 2, wherein the changing the power state includes one of canceling a planned spinning down of the HD or spinning up the HD.

4. A machine readable storage medium having stored thereon a set of instructions which when executed cause a system to perform a method comprising:
   making a first determination whether a number of previous consecutive reads of a hard drive (HD) satisfied by a non-volatile cache (NVC) of the HD is greater than or equal to a previously determined number;
   making a second determination whether a period of time of previous consecutive HD reads satisfied by the NVC of the HD is greater than or equal to a previously determined period of time;
   making a third determination whether a quantity of the NVC that would be available to service HD writes when the HD is spun down is greater than or equal to a previously determined quantity of memory space; and
   if the third determination is true and if at least one of the first determination and the second determination is also true, then
      spinning down the HD, and
      servicing HD data transactions with the NVC while the HD is spun down.

5. The machine readable storage medium of claim of claim 4, the method further comprising:
   making a fourth determination whether, in another previously determined period of time, a number of transactions which were serviced by the NVC or the HD is greater than or equal to another previously determined number; and
   if the fourth determination is true, then changing the power state of the HD.

6. The machine readable storage medium of claim 5, wherein the changing the power state includes one of canceling a planned spinning down of the HD or spinning up the HD.

7. A system comprising:
   a processor;
   a non-volatile cache (NVC) coupled to the processor, the NVC to serve as a cache for a hard drive (HD) of the system; and
   a machine readable storage medium having stored thereon a set of instructions which when executed cause the system to perform a method including,
      making a first determination whether a number of previous consecutive reads of a hard drive (HD) satisfied by a non-volatile cache (NVC) of the HD is greater than or equal to a previously determined number;
      making a second determination whether a period of time of previous consecutive HD reads satisfied by the NVC of the HD is greater than or equal to a previously determined period of time;
      making a third determination whether a quantity of the NVC that would be available to service HD writes when the HD is spun down is greater than or equal to a previously determined quantity of memory space; and
      if the third determination is true and if at least one of the first determination and the second determination is also true, then
         spinning down the HD, and
         servicing HD data transactions with the NVC while the HD is spun down.

8. The system of claim 7, the method further including making a fourth determination whether, in another previously determined period of time, a number of transactions which were serviced by the NVC or the HD is greater than or equal to another previously determined number, and
   if the fourth determination is true, then changing the power state of the HD.

9. The system of claim 8, wherein the changing the power state includes one of canceling a planned spinning down of the HD or spinning up the HD.

* * * * *